(No Model.)

O. H. STILL.
HOSE MENDER.

No. 509,458. Patented Nov. 28, 1893.

Witnesses.
Charles Hannigan.
E. B. Read.

Inventor.
Oliver H. Still
by Benj. Arnold
Atty.

UNITED STATES PATENT OFFICE.

OLIVER H. STILL, OF EAST GREENWICH, RHODE ISLAND, ASSIGNOR TO
J. WARREN LANDER, OF SAME PLACE.

HOSE-MENDER.

SPECIFICATION forming part of Letters Patent No. 509,458, dated November 28, 1893.

Application filed January 31, 1893. Serial No. 460,248. (No model.)

*To all whom it may concern:*

Be it known that I, OLIVER H. STILL, of East Greenwich, in the county of Kent and State of Rhode Island, have invented certain new and useful Improvements in Hose-Menders; and I do hereby declare that the following is a full, clear, and exact description thereof, reference being had to the accompanying drawings, and to the letters of reference marked thereon, which form a part of this specification.

This invention relates to that class of devices designed to be used in repairing hydraulic hose when injured, by cutting out the break or damaged part and joining the ends of the hose together in suitable manner to withstand the pressure and afford a free passage for the water through the hose. It is fully illustrated in the accompanying drawings.

Figure 1:
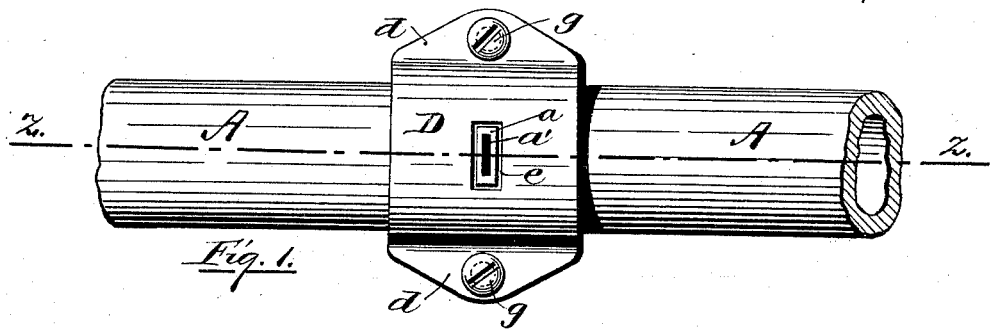
Figure 2:
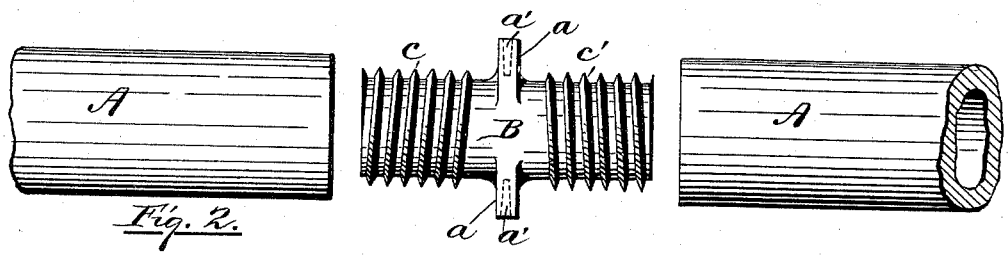
Figure 3:
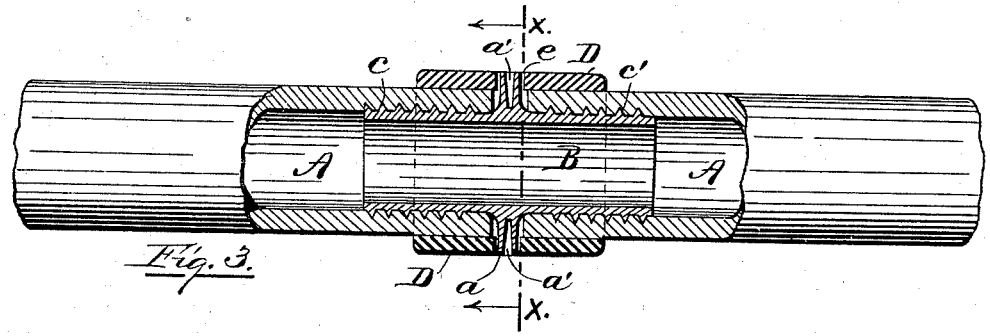
Figure 4:
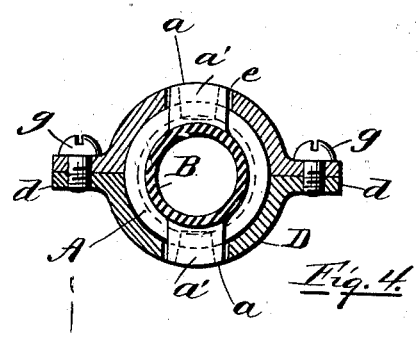

Figure 1 represents the device applied to join the ends of two portions of hose. Fig. 2 shows the central portion of the device in elevation, and two pieces of hose to be joined. Fig. 3 represents a longitudinal section of the joining device, and portions of the hose joined, on line $z$, $z$, Fig. 1. Fig. 4 shows a cross section of the parts all together as in Fig. 1, on line $x$, $x$, Fig. 3.

This hose mending device consists of a light central tube B, having two projections $a$, $a$, extending out radially from the middle, one on each side opposite to each other, and a right hand screw thread $c'$, is made on the surface of the tubes from near the projection $a$, to one end of the tube, and a left hand screw thread $c$, is made on the other end extending in like manner to the end of the tube or nearly so. This central tube portion B, of the device, is intended to be neatly cast in shape with fair screw threads without necessity for any hand finishing. The clamp D, is made in two parts curved in semi-circular form, a little smaller in diameter inside than the outside diameter of the hose A, to which they are to be applied. Each part of the clamp D, is provided with a radial ear $d$, on each side, and the two are fastened together in use by screws $g$, one on each side, which pass easily through the holes in the ears of one part, and screw into screw threads tapped in the holes in the ears of the other part. An opening or recess $e$, is made in the center of each part of the clamp D, to receive the projections $a$, $a$, of the tube B, when it is applied to the hose.

In applying the device to a hose that has been injured by bursting or otherwise, the damaged or broken part is first cut out so as to leave two sound ends of hose to apply it to. One end of the tube B, is then slightly caught in the end of one part of the hose, and then the end of the other part of the hose is pressed on to the other end of the tube, in both cases so as to catch the screw thread in the hose; then the tube B, is turned by the projections $a$, $a$, in the proper direction and the right and left hand screw threads $c$, $c'$, will draw the hose on to the tube on each side until it reaches the projections $a$, and this is done by means of the projections without turning or twisting the hose at all, which twisting is very troublesome, if there is much length of hose beyond the break. And in case the internal diameter of the hose is rather smaller than usual making it hard to turn the tube B, a recess $a'$, is provided in the end of one or both of the projections $a$, into which a screw driver or like tool, can be inserted to give a greater leverage in turning the part B, so as to bring the ends of the hose on to the screw threads. The parts of the clamp D, are then closed on the ends of the hose A, with the projections $a$, $a$, entering into the recess $e$, $e$, in each part, and the screws $g$, $g$, are inserted in the holes in the ears $d$, $d$, and turned in tight by means of a screw driver, so as to compress the hose on the screw-threads. This makes a cheap and efficient hose mender, and one that will outlast the hose to which it may be applied, and serve for more than one occasion.

Having thus described my improvement, I claim as my invention—

In a hose mender, a central tube having separate projections made on each side at its middle, and a right-hand screw thread made on one end, and a left hand screw-thread made on its other end, in combination with a divided clamp arranged to close on said tube, each division having an opening to receive one of the said projections on the tube, substantially as described.

OLIVER H. STILL.

Witnesses:
JAMES N. ARNOLD,
BENJ. ARNOLD.